(12) United States Patent
Li et al.

(10) Patent No.: US 11,637,345 B2
(45) Date of Patent: Apr. 25, 2023

(54) CAP ASSEMBLY FOR SECONDARY BATTERY, SECONDARY BATTERY AND BATTERY MODULE

(71) Applicant: Contemporary Amperex Technology Co., Limited, Ningde (CN)

(72) Inventors: Quankun Li, Ningde (CN); Peng Wang, Ningde (CN); Taosheng Zhu, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 15/892,694

(22) Filed: Feb. 9, 2018

(65) Prior Publication Data

US 2019/0067650 A1 Feb. 28, 2019

(30) Foreign Application Priority Data

Aug. 30, 2017 (CN) .......................... 201710764128.9

(51) Int. Cl.
*H01M 2/06* (2006.01)
*H01M 50/172* (2021.01)
(Continued)

(52) U.S. Cl.
CPC ......... *H01M 50/172* (2021.01); *H01M 10/04* (2013.01); *H01M 50/116* (2021.01);
(Continued)

(58) Field of Classification Search
CPC ........ H01M 2/06; H01M 2/0456; H01M 2/08; H01M 2/1016; H01M 2/345; H01M 2/30;
(Continued)

(56) References Cited

U.S. PATENT DOCUMENTS 4,240,197 A * 12/1980 Hamsag .............. H01M 2/0413
29/623.2
8,920,967 B2 * 12/2014 Ito ....................... H01M 50/543
429/178
(Continued)

FOREIGN PATENT DOCUMENTS

CN 101651229 A 2/2010
CN 102208591 A 10/2011
(Continued)

OTHER PUBLICATIONS

The extended European search report dated Oct. 9, 2018 for European Application No. 18155610.1, 17 pages.
(Continued)

*Primary Examiner* — Edward J. Schmiedel
(74) *Attorney, Agent, or Firm* — Morgan, Lewis & Bockius LLP

(57) ABSTRACT

The present disclosure provides a cap assembly for a secondary battery, a secondary battery and a battery module. The cap assembly for the secondary battery includes a cap plate, a first electrode terminal, and a sealing member, wherein: the cap plate has an electrode lead-out hole; the first electrode terminal includes a first terminal board and a second terminal board connected with the first terminal board, wherein the first terminal board is located at a side of the second terminal board away from the cap plate, the second terminal board covers the electrode lead-out hole, and the material of the first terminal board and the material of the second terminal board have different base metals; the sealing member surrounds the electrode lead-out hole and is disposed between the cap plate and the first electrode terminal to seal the electrode lead-out hole.

18 Claims, 11 Drawing Sheets

(51) Int. Cl.
*H01M 10/04* (2006.01)
*H01M 50/15* (2021.01)
*H01M 50/20* (2021.01)
*H01M 50/116* (2021.01)
*H01M 50/124* (2021.01)
*H01M 50/148* (2021.01)
*H01M 50/155* (2021.01)
*H01M 50/183* (2021.01)
*H01M 50/502* (2021.01)
*H01M 50/543* (2021.01)
*H01M 50/545* (2021.01)
*H01M 50/578* (2021.01)

(52) U.S. Cl.
CPC ....... *H01M 50/124* (2021.01); *H01M 50/148* (2021.01); *H01M 50/15* (2021.01); *H01M 50/155* (2021.01); *H01M 50/183* (2021.01); *H01M 50/20* (2021.01); *H01M 50/502* (2021.01); *H01M 50/543* (2021.01); *H01M 50/545* (2021.01); *H01M 50/578* (2021.01)

(58) Field of Classification Search
CPC .. H01M 2/027; H01M 2/0285; H01M 2/0287; H01M 2/202
See application file for complete search history.

(56) References Cited

U.S. PATENT DOCUMENTS

| | | | |
|---|---|---|---|
| 9,312,528 B2 | 4/2016 | Byun et al. | |
| 2003/0059678 A1* | 3/2003 | Nam | H01M 50/191 429/175 |
| 2007/0154802 A1* | 7/2007 | Uh | H01M 2/0404 429/180 |
| 2010/0040943 A1* | 2/2010 | Kim | H01M 2/30 429/163 |
| 2010/0233528 A1* | 9/2010 | Kim | H01M 10/0413 429/178 |
| 2011/0076555 A1* | 3/2011 | Jeong | H01M 50/147 429/185 |
| 2011/0268999 A1* | 11/2011 | Nagai | H01M 50/543 429/53 |
| 2012/0189908 A1* | 7/2012 | Tsutsumi | H01M 50/155 29/623.2 |
| 2013/0059170 A1* | 3/2013 | Kim | H01M 50/567 429/7 |
| 2013/0177803 A1* | 7/2013 | Kugino | H01M 10/0525 429/179 |
| 2013/0323574 A1* | 12/2013 | Tsunaki | H01M 50/543 429/158 |
| 2014/0349152 A1 | 11/2014 | Guen | |
| 2016/0204397 A1* | 7/2016 | Cai | H01M 2/0482 429/175 |
| 2018/0019459 A1* | 1/2018 | Lobert | H01M 10/052 |
| 2018/0233714 A1 | 8/2018 | Guo et al. | |

FOREIGN PATENT DOCUMENTS

| | | |
|---|---|---|
| CN | 102034954 B | 1/2014 |
| CN | 105845848 A | 8/2016 |
| CN | 105870375 A | 8/2016 |
| CN | 106299172 A | 1/2017 |
| CN | 106784445 A | 5/2017 |
| EP | 2490282 A1 | 8/2012 |
| EP | 3168899 A1 | 5/2017 |
| EP | 3255699 A1 | 12/2017 |
| JP | 2013161692 A | 8/2013 |
| WO | 2017115857 A1 | 7/2017 |

OTHER PUBLICATIONS

The extended European search report dated May 4, 2020 for European Application No. 20152625.8, 11 pages.
The Notification to Grant Patent Right for Invention dated Mar. 30, 2021 for Chinese Application No. 202010694016.2, 6 pages.

* cited by examiner

CAP ASSEMBLY FOR SECONDARY BATTERY, SECONDARY BATTERY AND BATTERY MODULE

CROSS-REFERENCE TO RELATED APPLICATION

This application is based upon and claims priority to Chinese Patent Application No. 201710764128.9, filed on Aug. 30, 2017, the content of which is incorporated herein by reference in its entirety.

FIELD

The present disclosure relates to the technical field of energy storage devices, and in particular, to a cap assembly for a secondary battery, a secondary battery and a battery module.

BACKGROUND

In a non-aqueous electrolyte secondary battery, aluminum or aluminum alloy that does not dissolve in a non-aqueous electrolyte at positive electrode potential is preferably used as a constituent material of a positive electrode terminal post. Copper or copper alloy, etc. that will not be alloyed with a negative electrode active material is often used as a constituent material of a negative electrode terminal post.

In the prior art, a positive electrode terminal includes a positive electrode terminal post and a positive electrode connection block, and a negative electrode terminal includes a negative electrode terminal post and a negative electrode connection block, and the positive electrode connection block and the negative electrode connection block are exposed outside the cap plate. When secondary batteries are assembled, a busbar needs to be welded on positive electrode connection blocks or negative electrode connection blocks. Since a busbar is often made of a single material (such as aluminum or copper) while aluminum has lower melting point and higher specific heat capacity than copper, it is not easy to weld copper material and aluminum material together by ultrasonic welding, laser welding or the like. Therefore, the positive electrode connection blocks and the negative electrode connection blocks are required to be made of the same material as the busbar (that is, both are made of aluminum material or both made of copper material). In the related art, the common solution is to perform copper-aluminum conversion on a negative electrode terminal post by friction welding, that is, a lower part of the negative electrode terminal post employs copper material, while a upper part of the negative electrode terminal post and the busbar employs aluminum material, and the lower part of the negative electrode terminal post and the upper part of the negative electrode terminal post are connected by friction welding.

However, the negative electrode terminal post not only serves as a conductive element, but also serves to fix a sealing ring. In the prior art, a sealing ring is often disposed between a negative electrode terminal post and a cap plate inside a shell. Since the sealing ring requires force compression to improve the sealing, the negative electrode terminal post will be subject to compressive stress by the sealing ring. The compressive stress may cause a connection interface between the lower part of the negative electrode terminal post and the upper part of the negative electrode terminal post to be subject to tensile stress for a long time. Meanwhile, the copper material and the aluminum material are difficult to be welded together. Therefore, the connection interface between them is the weakest place, and thus a secondary battery is easy to crack or even disconnect at the connection interface after being used for a period of time, resulting in the occurrence of leakage. This situation is more prone to occur when a diameter of the negative electrode terminal post is small.

Meanwhile, since the negative electrode terminal post has a portion located inside the shell (usually 1.5 to 4 mm) and the sealing ring has a certain thickness (usually 0.5 to 1.5 mm), space utilization inside the shell of the battery is low, causing the energy density of the battery to be low, and since each negative electrode terminal post needs friction welding and machining, the manufacturing process is complicated and the manufacturing cost is high.

Therefore, there is a need for a new cap assembly for a secondary battery, a new secondary battery and a new battery module.

SUMMARY

According to an aspect of the embodiments of the present disclosure, there is provided a cap assembly for a secondary battery. The cap assembly includes a cap plate, a first electrode terminal, and a sealing member, wherein: the cap plate has an electrode lead-out hole; the first electrode terminal comprises a first terminal board and a second terminal board connected with the first terminal board, wherein the first terminal board is located at a side of the second terminal board away from the cap plate, the second terminal board covers the electrode lead-out hole, and the material of the first terminal board and the material of the second terminal board have different base metals; the sealing member surrounds the electrode lead-out hole and is disposed between the cap plate and the first electrode terminal to seal the electrode lead-out hole.

According to an aspect of the embodiments of the present disclosure, the sealing member is in close contact with the cap plate and the second terminal board.

According to an aspect of the embodiments of the present disclosure, the first terminal board and the second terminal board form a composite board strip.

According to an aspect of the embodiments of the present disclosure, the second terminal board further includes an extension portion extending into the electrode lead-out hole.

According to an aspect of the embodiments of the present disclosure, the first terminal board and the second terminal board are joined together by a cold rolling method, a hot rolling method, an explosion compound method, or an explosion rolling method.

According to an aspect of the embodiments of the present disclosure, the cap assembly further includes a fixing member and a connecting member, wherein the fixing member is fixed to the cap plate through the connecting member, and an outer peripheral surface of the first electrode terminal is at least partially surrounded by the fixing member to fix the first electrode terminal to the fixing member.

According to an aspect of the embodiments of the present disclosure, one of the first electrode terminal and the fixing member has a convex portion, and the other has a concave portion that accommodates the convex portion, and the convex portion is fitted with the concave portion.

According to an aspect of the embodiments of the present disclosure, the convex portion is provided on the outer peripheral surface of the first electrode terminal, the concave portion is provided on an inner wall surface of the fixing member corresponding to the convex portion, and a surface of the first electrode terminal away from the cap plate protrudes from a surface of the fixing member away from the cap plate.

According to an aspect of the embodiments of the present disclosure, the convex portion is provided on an outer peripheral surface of the first terminal board.

According to an aspect of the embodiments of the present disclosure, the fixing member is a hard plastic member, a portion of the fixing member is located between the cap plate and the first electrode terminal.

According to an aspect of the embodiments of the present disclosure, the connecting member includes a nail body and a limiting portion which are connected with each other, and wherein an outer peripheral surface of the limiting portion protrudes from an outer peripheral surface of the nail body, an end of the nail body away from the limiting portion is fixed on the cap plate, and the limiting portion is engaged with the fixing member.

According to an aspect of the embodiments of the present disclosure, the connecting member includes a first connecting plate, and wherein a portion of the first connecting plate is embedded into the fixing member and engaged with the fixing member, and another portion of the first connecting plate is welded with the cap plate.

According to an aspect of the embodiments of the present disclosure, the connecting member includes an undercut and an undercut hole, wherein the undercut hole is provided on a surface of the cap plate facing the fixing member, and an aperture of the undercut hole is increased along a direction from the first terminal board to the cap plate, the undercut is connected with the fixing member and is adapted with the undercut hole in form, and the undercut is fitted with the undercut hole.

According to an aspect of the embodiments of the present disclosure, the cap assembly further includes a second electrode terminal, a deformable sheet and a conductive sheet, wherein the second electrode terminal is electrically connected with the cap plate, the first electrode terminal is insulated from the cap plate, the deformable sheet is attached to cap plate, the conductive sheet is electrically connected with the first electrode terminal, wherein when a pressure within the secondary battery exceeds a predetermined pressure value, the deformable sheet deforms and is electrically connected with the conductive sheet.

According to an aspect of the embodiments of the present disclosure, the conductive sheet and the first electrode terminal are located on the same side of the cap plate, a surface of the conductive sheet away from the cap plate protrudes from a surface of the first electrode terminal away from the cap plate.

According to an aspect of the embodiments of the present disclosure, the material of the first terminal board and the material of the conductive sheet have a same base metal.

According to another aspect of the embodiments of the present disclosure, there is also provided a secondary battery. The secondary battery includes a shell having an opening, an electrode assembly accommodated in the shell, and the cap assembly described above, wherein the cap assembly covers the opening of the shell to enclose the electrode assembly in the shell.

According to yet another aspect of the embodiments of the present disclosure, there is also provided a battery module including a busbar and the secondary battery described above, wherein the busbar is welded to the first terminal board.

According to yet another aspect of the embodiments of the present disclosure, the material of the busbar and the material of the first terminal board have a same base metal.

BRIEF DESCRIPTION OF THE DRAWINGS

The present disclosure may be better understood from the following descriptions of specific embodiments of the present disclosure by taken in conjunction with the accompanying drawings, in which.

Other features, objects, and advantages of the present disclosure will become more apparent by reading the following detailed descriptions of non-limiting embodiments with reference to the accompanying drawings, in which the same or similar reference signs denote the same or similar features.

REFERENCE LABELS IN THE FIGURES

Figure 1:
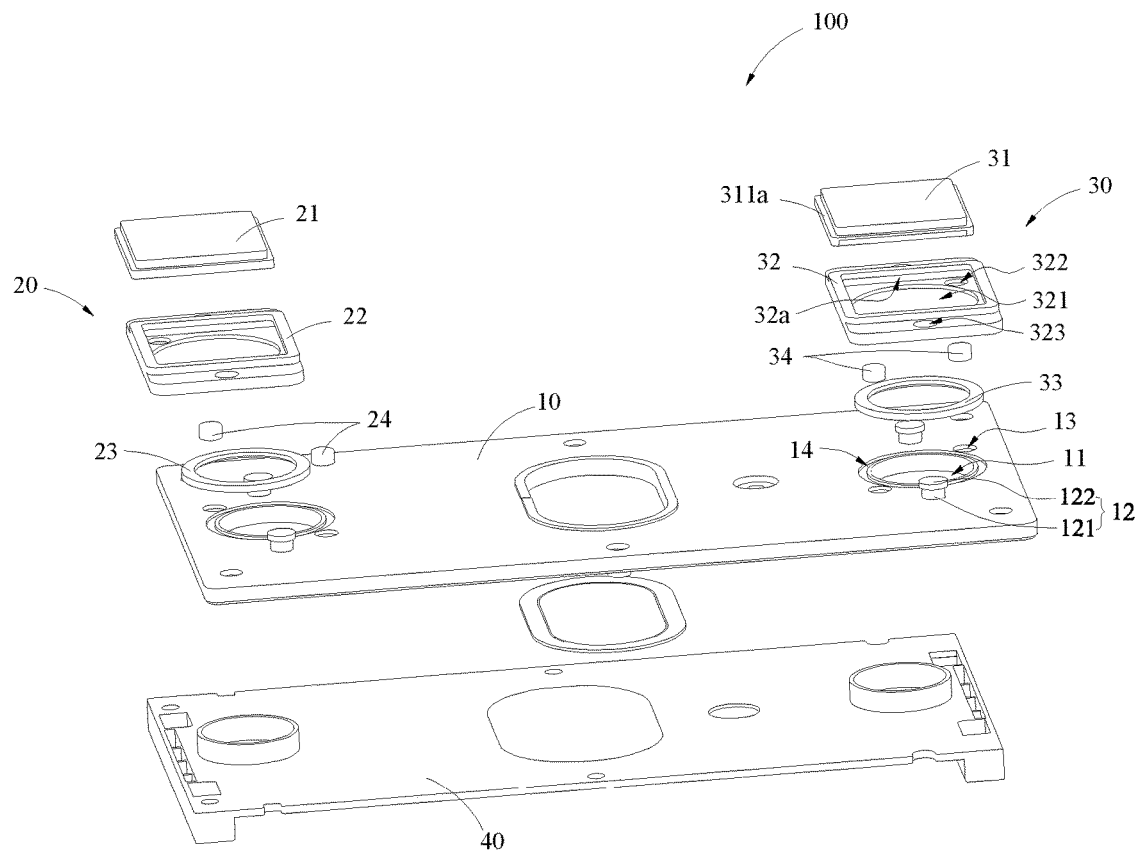
FIG. 1 is a schematic diagram of an exploded structure of a cap assembly for a secondary battery according to an embodiment of the present disclosure.

100—Cap assembly
101—Cap assembly
102—Cap assembly
103—Cap assembly
10—Cap plate
11—Electrode lead-out hole
12—Riveting member
121—Nail body;
122—Limiting portion
13—Second groove
14—Accommodation groove
15—Liquid injection hole
16—Anti-explosion valve assembly
17—Mounting hole
18—Sunken portion
20—Terminal assembly
21—Second electrode terminal
22—Fixing member
23—Sealing member
24—Stopper
30—Terminal assembly
31—First electrode terminal
311—First terminal board
311a—Convex portion
311b—Lower surface of the first terminal board
312—Second terminal board
312a—Outer peripheral surface of the second terminal board
312b—Lower surface of the second terminal board
312c—First groove
32—Fixing member
32a—Concave portion
321—First through hole
322—Via hole
323—Connecting hole
324—Notch
325—Second through hole
326—Undercut
33—Sealing member
33a—Annular protrusion portion
34—Stopper
35—First connecting plate
36—Deformable sheet
361—Bent portion
362—Circumferential edge portion
363—Protruding portion
37—Conductive sheet
40—Lower insulator
41—Insulator
43—Second connecting plate

DETAILED DESCRIPTION

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. In the drawings and the following description, at least a part of well-known structures and techniques are not shown in order to avoid unnecessarily obscuring the present disclosure. Further, for clarity, the size of a part of the structures may be exaggerated. The same reference numerals in the drawings denote the same or similar structures, and thus their detailed description will be omitted. Furthermore, the features, structures, or characteristics described below can be combined in any suitable manner in one or more embodiments.

The terms denoting directions that appear in the following description indicate directions shown in the drawings, and do not limit specific structures of the cap assembly for the secondary battery of the present disclosure. In the description of the present disclosure, it should also be noted that the terms "mounted", "connected" and "connection" should be interpreted in a broad sense unless explicitly defined and limited otherwise. For example, it may indicate "fixed connection", "disassemble connection" or "integral connection"; it may indicate "mechanical connection", "electrical connection"; it may indicate a direct connection or an indirect connection. For those skilled in the art, specific meanings of the above terms in the present disclosure may be understood depending on specific situations.

The cap assembly for the secondary battery provided by embodiments of the present disclosure can cover an opening of a shell of the secondary battery to seal an electrode assembly and electrolyte used to produce an electrochemical reaction into the shell and enable an electrical connection between the electrode assembly and electrode terminals outside the shell. The cap assembly according to embodiments of the present disclosure can reduce the occupancy of the internal space of the shell of the battery while ensuring the sealing effect of the shell of the battery. Therefore, it is possible to increase the energy density of the secondary battery and to reduce the probability of occurrence of a swelling phenomenon caused by the sealing member contacting the electrolyte inside the shell, and meanwhile, the connection interface between the first terminal board and the second terminal board can be prevented from being in a tensile stress state for a long time, so as to reduce the risk of fracture of the first electrode terminal, thereby ensuring the reliability of the use of the secondary battery.

For a better understanding of the present disclosure, a cap assembly for a secondary battery according to embodiments of the present disclosure will be described in detail below with reference to FIG. 1 to FIG. 20.

Figure 2:
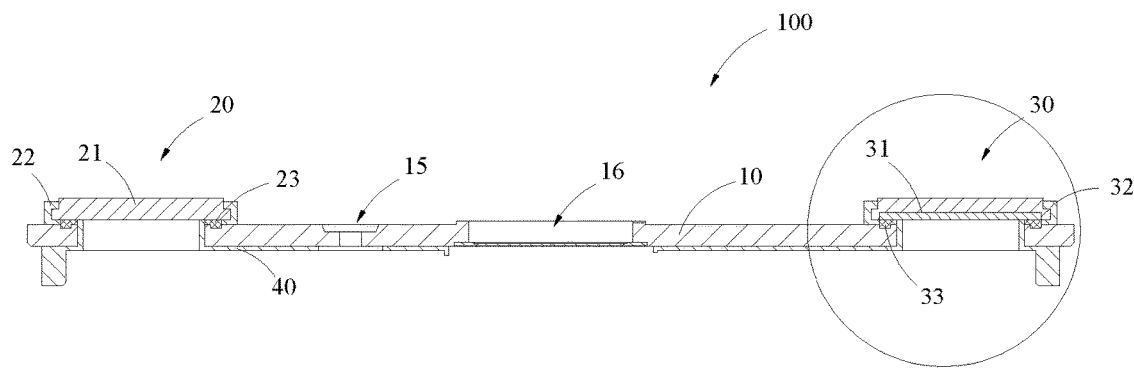
FIG. 2 is a schematic cross-sectional structural diagram of the cap assembly of FIG. 1 taken along a longitudinal direction.
Figure 3:
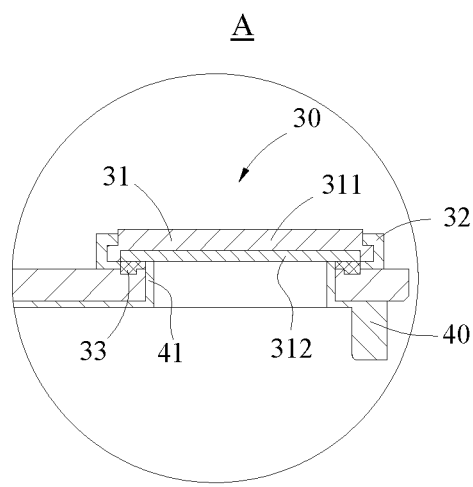
FIG. 3 is an enlarged partial view of a portion A of the cap assembly of FIG. 2.

FIG. 1 is a schematic diagram of an exploded structure of a cap assembly 100 for a secondary battery according to an embodiment of the present disclosure; FIG. 2 is a schematic cross-sectional structural diagram of the cap assembly 100 of FIG. 1 taken along a longitudinal direction; FIG. 3 is an enlarged partial view of a portion A of the cap assembly 100 of FIG. 2. As shown in FIG. 1 to FIG. 3, the cap assembly 100 may include a cap plate 10, a first electrode terminal 31, and a sealing member 33. The cap plate 10 may have an electrode lead-out hole 11; the first electrode terminal 31 may include a first terminal board 311 and a second terminal board 312 connected with the first terminal board 311, wherein the first terminal board 311 is located at a side of the second terminal board 312 away from the cap plate 10, the second terminal board 312 covers the electrode lead-out hole 11, and the material of the first terminal board 311 and the material of the second terminal board 312 have different base metals (the main metal in the composition of an alloy is called the base metal, for example, iron is the base metal in an iron-carbon alloy, iron is the base metal in an iron-nickel alloy with less than 50% nickel, nickel is the base metal in an iron-nickel alloy with more than 50% nickel); the sealing member 33 surrounds the electrode lead-out hole 11 and is attached between the cap plate 10 and the first electrode terminal 31 to seal the electrode lead-out hole 11.

Since the cap assembly 100 provided by embodiments of the present disclosure configures the first electrode terminal 31 to include the first terminal board 311 and the second terminal board 312 having different base metals, and the second terminal board 312 covers the electrode lead-out hole 11 provided on the cap plate 10 while the first terminal board 311 is located on a side away from the cap plate 10 compared to the second terminal board 312, so that the first electrode terminal 31 can achieve the composition of the first terminal board 311 and the second terminal board 312 to improve the welding strength between an external busbar and the first electrode terminal 31.

At the same time, the sealing member 33 for sealing the electrode lead-out hole 11 surrounds the electrode lead-out hole 11 and is attached between the first electrode terminal 31 and the cap plate 10, so as to reduce the occupancy of the internal space of the shell of the battery, increase the energy density of the secondary battery and reduce the probability of occurrence of a swelling phenomenon caused by the sealing member 33 contacting the electrolyte inside the shell to ensure the reliability of the use of the secondary battery. Also, for the first electrode terminal 31 including two terminal boards having different base metals, the sealing member 33 is provided between the cap plate 10 and the first electrode terminal 31. As compared with a conventional cap assembly, since the sealing member 33 is not between the two terminal boards, there is no mutual pulling force between the two terminal boards, so that the connection interface between the first terminal board 311 and the second terminal board 312 can be prevented from being in a tensile stress state for a long time, so as to reduce the risk of fracture of the first electrode terminal 31, thereby ensuring the reliability of the use of the secondary battery. The electrode assembly is placed in an internal cavity of the shell (not shown in the figures) together with the electrolyte, and the electrode assembly is formed by helically winding or sequentially stacking a positive electrode plate, a negative electrode plate and a separator. The separator is an insulator between the positive electrode plate and the negative electrode plate.

According to one embodiment of the present disclosure, the cap assembly 100 generally includes a cap plate 10, a terminal assembly 20, a terminal assembly 30, and a lower insulator 40. The cap plate 10 has a thin plate shape and has a size and shape matching the opening of the shell so as to be connectable to the opening of the shell. The cap plate 10 is made of a metal material, for example, the same metal material as that of the shell can be selected. In this embodiment, the electrode lead-out hole 11, a riveting member 12, a second groove 13, an accommodation groove 14, a liquid injection hole 15 and an anti-explosion valve assembly 16 is provided on the cap plate 10.

The liquid injection hole 15 is formed on the cap plate 10 in a predetermined size, so that the electrolyte can be injected into the accommodation space of the shell through the liquid injection hole 15 after the cap plate 10 covers the opening of the shell and is hermetically connected with the shell.

The anti-explosion valve assembly 16 may adopt a conventional structure (for example, by providing a rupture disc) and may be disposed at a substantially central position of the cap plate 10. When the gas pressure inside the second battery becomes too large as a result of over-charging, over-discharging, or over-heating of the second battery, the rupture disc in the anti-explosion valve assembly 16 can be broken so that the gas produced inside the secondary battery can be exhausted to the outside via a through hole of the anti-explosion valve assembly 16, thereby being able to prevent the secondary battery from exploding.

The cap plate 10 is provided with two electrode lead-out holes 11 for guiding the electric energy in the electrode assembly inside the shell to the outside of the cap plate 10. As shown in FIGS. 1-3, the terminal assembly 30 generally includes a first electrode terminal 31, a fixing member 32, and a sealing member 33; likewise, the terminal assembly 20 generally includes a second electrode terminal 21, a fixing member 22 and a sealing member 23. The structure of the terminal assembly 30 and its mounting on the cap plate 10 will be described below only as an example. Further, the following description will be provided in such an exemplary way that the terminal assembly 20 is a terminal assembly at the positive electrode and the terminal assembly 30 is a terminal assembly at the negative electrode.

In order to maintain the insulation between the cap plate 10 and the electrode assembly inside the shell as well as between the cap plate 10 and a wiring board (not shown in the figures), the lower insulator 40 is generally made of a plastic material, and its main body has a substantially plate shape and is attached at a surface of the cap plate 10 facing the inner side of the shell. The main structure of the lower insulator 40 has two through holes respectively corresponding to the cap plate 10, and a first insulator 41 disposed around an outer periphery of the two through holes. The two through holes are respectively opposite to the two electrode lead-out holes 11.

In this embodiment, the first insulating member 41 has a ring shape, and the body portion thereof extends into the electrode lead-out hole 11. In an optional embodiment, the body portion has a size larger than that of the electrode lead-out hole 11 so that the lower insulator 40 can be connected with the cap plate 10 by an interference fit between the body portion and the electrode lead-out hole 11. In another optional embodiment, an end face of the body portion near an electrode terminal protrudes from a surface of the cap plate 10 near the electrode terminal.

Referring to FIGS. 2 and 3, the first electrode terminal 31 is a square thin board structure and includes a first terminal board 311 and a second terminal board 312. In order to achieve laser welding between the first electrode terminal 31 and the second electrode terminal 21 and the busbar respectively, the portions of the first electrode terminal 31 and the second electrode terminal 21 connected to the busbar need to use a material having a same base metal as the busbar.

Exemplarily, for example, when the material of the busbar is aluminum, the second electrode terminal 21 may be directly connected to the busbar by soldering because the base metal of the second electrode terminal 21 itself is aluminum. However, for the first electrode terminal 31 connected to the negative electrode plate, it is necessary to perform copper-aluminum conversion. Since the first terminal board 311 is farther away from the cap plate 10 than the second terminal board 312, the first terminal board 311 connected with the busbar uses aluminum as the base metal, and the second terminal board 312 connected with the negative electrode plate uses copper as the base metal. Since the material of the first terminal board 311 uses aluminum as the base metal and the material of the second terminal board 312 uses copper as the base metal, that is, the redox potential of the second terminal board 312 is higher than the redox potential of the first terminal board 311 (there is an redox potential difference between them), therefore, corrosion will occur at the connection interface between the first terminal board 311 and the second terminal board 312 if the electrolyte contacts the first terminal board 311. In this embodiment, the sealing member 33 is in close contact with the cap plate 10 and the second terminal 312, so as to prevent the first terminal board 311 from contacting with the electrolyte inside the shell, therefore preventing the connection interface between the first terminal board 311 and the second terminal board 312 from being corroded.

Figure 4:
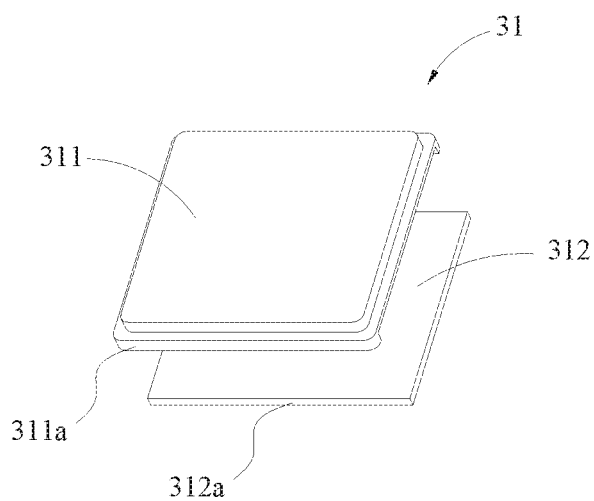
FIG. 4 is a schematic diagram of an exploded structure of the first electrode terminal in the cap assembly of FIGS. 1 to 3.
Figure 5:
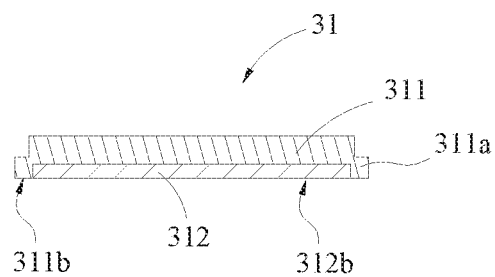
FIG. 5 is a schematic cross-sectional structural diagram of the first electrode terminal in FIG. 4 taken along a longitudinal direction.
Figure 6:
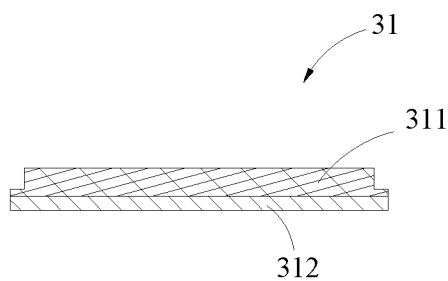
FIG. 6 is a schematic cross-sectional structural diagram of the first electrode terminal in FIG. 4 taken along a transverse direction.

FIG. 4 is a schematic diagram of an exploded structure of the first electrode terminal 31 in the cap assembly 100 in FIGS. 1 to 3; FIG. 5 is a schematic cross-sectional structural diagram of the first electrode terminal 31 in FIG. 4 taken along a longitudinal direction; FIG. 6 is a schematic cross-sectional structural diagram of the first electrode terminal in FIG. 4 taken along a transverse direction. As shown in FIG. 4 to FIG. 6, a specific composition manner of the first terminal board 311 and the second terminal board 312 in the first electrode terminal 31 is shown.

Specifically, the first terminal board 311 and the second terminal board 312 are substantially in the form of a sheet, and the first terminal board 311 and the second terminal board 312 form a composite board strip, that is, the first electrode terminal 31 is in a board structure. A groove (not shown) is provided on a side of the first terminal board 311 facing the cap plate 10, and the groove forms openings on opposite end surfaces at two sides of the first terminal board 311 respectively. The contour of the second terminal board 312 is adapted to the contour of the groove, so that the second terminal board 312 is snapped into the groove of the first terminal board 311, and the second terminal board 312 is connected to the first terminal board 311 in a close fitting manner on three sides. That is, the first terminal board 311 covers a side of the second terminal board 312 away from the cap plate 10, and opposite side edges of the first terminal board 311 extend along the outer peripheral surface 312a of the second terminal board toward the cap plate 10, so that a lower surface 311b of the first terminal board and a lower surface 312b of the second terminal board are substantially in a same level.

For example, the first terminal board 311 uses aluminum as the base metal, and the second terminal board 312 uses copper as the base metal. By disposing the first electrode terminal 31 such that the first terminal board 311 coats the second terminal board 312 along two sides of the outer peripheral surface 312a of the second terminal board, the first electrode terminal 31 can be manufactured by first coating an elongated copper board with an elongated aluminum plate via the above coating method to form a composite board strip. It can also be understood as the elongated aluminum board is provided with a penetrating groove in the longitudinal direction, and the elongated copper board is inserted into the groove to form an elongated composite board strip. The elongated composite board strip may then be cut into a plurality of first electrode terminals 31. Therefore, the first electrode terminals 31 can be mass-produced without requiring separate processing for each of the first electrode terminals 31. Therefore, the production efficiency of the first electrode terminal 31 can be improved, and the production cost can be reduced.

Since the first terminal board 311 and the second terminal board 312 are made of different materials, the first terminal board 311 and the second terminal board 312 cannot be firmly connected by a common laser welding method. For the bonding method between the first terminal board 311 and the second terminal board 312 for making the first electrode terminal 31, embodiments of the present disclosure are not limited in this respect. For example, the first terminal board 311 and the second terminal board 312 may be connected by means of metallurgical bonding (that is, bonding formed by mutual diffusion of atoms between two metal interfaces). In other embodiments, for example, the first terminal board 311 and the second terminal board 312 may be composited by a method such as a cold rolling method, a hot rolling method, an explosion compound method or an explosion rolling method.

In addition, in some embodiments, the first terminal board 311 and the second terminal board 312 may be combined with each other by bonding the first terminal board 311 in sheet form and the second terminal board 312 in sheet form to each other directly on one side so as to form a composite board strip (i.e., the first terminal board 311 is not provided with a groove, and the second terminal board 312 and the first terminal board 311 are stacked). Certainly, connecting the first terminal board 311 and the second terminal board 312 in this way can also achieve the purpose of mass production of the first electrode terminal 31. In an exemplary embodiment, the fixing member 32 is a hard plastic member, wherein the "hard" herein means that the fixing member needs to have a certain strength so that the fixing member 32 can fix the first electrode terminal 31 on the cap plate 10 to seal the electrode lead-out hole 11 by the sealing member 33.

For example, the fixing member 32 may be made of a high-temperature-resistant insulating plastic material such as one or more of polyphenylene sulfide (PPS), perfluoroalkoxy resin (PFA) or polypropylene (PP) by an integral injection molding process, so that the fixing member 32 can ensure the fastening force with the cap plate 10 while being in close contact with the first electrode terminal 31.

With continued reference to FIGS. 1 to 3, the fixing member 32 has an accommodation space adapted to the shape of the first electrode terminal 31, so as to contain the first electrode terminal 31 in the accommodation space so that the fixing member 32 and the first electrode terminal 31 are fixed. Preferably, a part of the fixing member 32 is clamped between the first electrode terminal 31 and the cap plate 10. In order to increase the fastening force for bonding the first electrode terminal 31 and the fixing member 32 to each other, an annular convex portion 311a is provided on the outer peripheral surface of the first electrode terminal 31, and correspondingly, an annular concave portion 32a capable of accommodating the annular convex portion 311a is provided on an inner wall surface of the fixing member 32 being affixed to the first electrode terminal 31. After the first electrode terminal 31 is placed in the accommodation space of the fixing member 32, the convex portion 311a and the concave portion 32a are snap-fitted with each other so that the first electrode terminal 31 can be firmly connected with the fixing member 32. Of course, the fixing as mentioned herein refers to that the first electrode terminal 31 does not move in the thickness direction relative to the fixing member 32. Alternatively, a part of the fixing member 32 may also not be disposed between the first electrode terminal 31 and the cap plate 10.

In an optional embodiment, in the first electrode terminal 31, a convex portion 311a is provided on the outer peripheral surface of the first terminal board 311 to surround the outer peripheral surface of the first terminal board 311 by the fixing member 32. Since the busbar is welded to the first terminal board 311, the busbar will generate a tensile stress on the first terminal board 311 when the battery is inflated.

If the fixing member 32 only surrounds the outer peripheral surface of the second terminal board 312, a tensile stress will be generated at the connection interface between the first terminal board 311 and the second terminal board 312. Therefore, by surrounding the outer peripheral surface of the first terminal board 311 through the fixing member 32, the connection interface between the first terminal board 311 and the second terminal board 312 can be prevented from cracking due to a tensile stress.

After the first electrode terminal 31 and the fixing member 32 are connected to each other, the second terminal board 312 covers the electrode lead-out hole 11 and the outer peripheral surface of the second terminal board 312 protrudes from the inner wall of the electrode lead-out hole 11 (i.e., as shown in FIG. 3, the cross-sectional size of the second terminal board 312 is greater than the cross-sectional size of the electrode lead-out hole 11), and a surface of the first electrode terminal 31 away from the cap plate 10 protrudes from a surface of the fixed member 32 away from the cap plate 10 (i.e., according to the viewing direction of FIG. 2, the upper surface of the first electrode terminal 31 is higher than the upper surface of the fixing member 32). At the same time, a first through hole 321 is disposed on a side of the fixing member 32 close to the cap plate 10 so that the first electrode terminal 31 can be exposed inside the shell through the first through hole 321, so as to be electrically connected with the electrode assembly.

In an optional embodiment, the first electrode terminal 31 is a board-like structure, and a surface of the first electrode terminal 31 close to the cap plate 10 does not exceed a surface of the cap plate 10 close to the first electrode terminal 31 (i.e., the first electrode terminal 31 is composed of the first terminal board 311 and the second terminal board 312, and the first electrode terminal 31 does not protrude into the electrode lead-out hole 11).

Since the cap assembly 100 is connected to the busbar through a surface of the first electrode terminal 31 away from the cap plate 10, when the plurality of the secondary batteries are connected in series or in parallel, it is possible to increase the contact area between the first electrode terminal 31 and the busbar, and thus to improve the overcurrent capability of the electric first electrode terminal 31. And since the outer peripheral surface of the first electrode terminal 31 protrudes from the inner wall of the electrode lead-out hole 11, the terminal assembly 30 needs to be assembled from the top to the bottom when the terminal assembly 30 is assembled. Therefore, the first electrode terminal 31 is fixed only by the fixing member 32, and it is not necessary to separately provide another fixing structure on the first electrode terminal 31 itself, so that the structure of the first electrode terminal 31 can be simplified. Compared with a terminal post structure provided on a cap plate of a conventional secondary battery, in the embodiments of the present disclosure, the first electrode terminal 31 having a board-like structure can be mass-processed by a punching method, thereby effectively improving the production efficiency and reducing the manufacturing cost. Moreover, it is not necessary to occupy the space inside the shell, and thus the energy density of the secondary battery can be effectively increased.

As a modification of the above-described embodiment, the first electrode terminal 31 and the fixing member 32 may be bonded to each other by providing an annular convex portion on the outer peripheral surfaces of the first electrode terminal board 311 and the second electrode terminal board 312 simultaneously, and correspondingly providing an annular concave portion on the inner wall surface of the fixing member 32, so as to engage with each other through the convex portion and the concave portion. In addition, a concave portion may be provided on the outer peripheral surface of the first electrode terminal 31, and a corresponding convex portion may be provided on the inner wall surface of the fixing member 32.

With continued reference to FIGS. 1-3, the sealing member 33 is disposed between the first electrode terminal 31 and the cap plate 10. Specifically, according to one embodiment of the present disclosure, the sealing member 33 is disposed between the second terminal board 312 and the cap plate 10. In this embodiment, the sealing member 33 is annular and is disposed between the second terminal board 312 and the cap plate 10 and surrounds the electrode lead-out hole 11.

Figure 7:
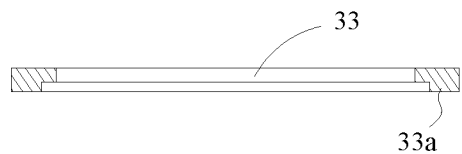
FIG. 7 is a schematic cross-sectional structural diagram of the sealing member in the cap assembly of FIGS. 1 to 3 taken along a thickness direction.

FIG. 7 is a schematic cross-sectional structural diagram of the sealing member 33 in FIGS. 1 to 3 taken along a thickness direction. As shown in FIG. 7, in this embodiment, specifically, the sealing member 33 is annular, and a surface of the sealing member 33 facing the cap plate 10 is formed as a staircase structure, that is, the surface of the sealing member 33 facing the cap plate 10 is provided with an annular protrusion portion 33a. The cap plate 10 is provided with an annular accommodation groove 14 around the electrode lead-out hole 11, the annular protrusion portion 33a of the sealing member 33 can be fitted in the accommodation groove 14 for positioning the sealing member 33 through the accommodation groove 14, so as to avoid the sealing member 33 to move between the second terminal board 312 and the cap plate 10, while reducing the overall height of the cap assembly 100 and thus increasing the energy density of the secondary battery. In this embodiment, the sealing member 33 is in close contact with the second terminal board 312, the fixing member 32, the cap plate 10 and the lower insulator 40 at the same time, therefore the sealing member 33 can be subject to a uniform pressing force to enable the sealing member 33 to fully fill the space for accommodating the groove 14. Therefore the sealing effect of the sealing member 33 can be further enhanced. Also, as the sealing member 33 is provided outside the shell, the probability of contacting with the electrolyte inside of the shell can be reduced.

Since the first electrode terminal 31 and the fixing member 32 are simultaneously fixed to the upper portion (relative to the shell of the secondary battery) of the cap plate 10, the first electrode terminal 31 and the fixing member 32 can always provide the sealing member 33 with the pressing force, so that the sealing performance of the sealing member 33 can be improved. Also, since the sealing member 33 is disposed between the first electrode terminal 31 and the cap plate 10, the connection interface between the first terminal board 311 and the second terminal board 312 of the first electrode terminal 31 will not be subject to a tensile stress for a long time resulting from pressing the sealing member 33, and thus the connection interface between the first terminal board 311 and the second terminal board 312 will not crack, so that it is possible to avoid the occurrence of liquid leakage due to the fracture of the first electrode terminal 31.

Of course, the specific shape of the sealing member 33 will not be limited in the embodiments of the present disclosure. In other embodiments, the shape of the sealing member 33 may also be rectangular or other shapes. Of course, at this time, the accommodation groove 14 needs to be adapted to the shape of the sealing member 33. In addition, in some embodiments, the fixing member 32 and the sealing member 33 may also be provided in an integral form, of course, in this case, the material of the fixing member 32 needs to have both sealing function and certain hardness.

In an alternative embodiment, the sealing member 33 may further include a body portion of the sealing member and an extension portion of the sealing member (not shown in the figures), wherein the body portion of the sealing member is sandwiched between the first electrode terminal 31 and the cap plate 10, the extension portion of the sealing member is connected with the body portion of the sealing member and extends into the electrode lead-out hole 11. Specifically, the extension portion of the sealing member is annular and is in close contact with the inner wall of the electrode lead-out hole 11, so as to be able to be clamped between the inner wall of the electrode lead-out hole 11 and an outer wall of the annular first insulator 41, and thus to further enhance the sealing performance of the sealing member 33.

Figure 8:
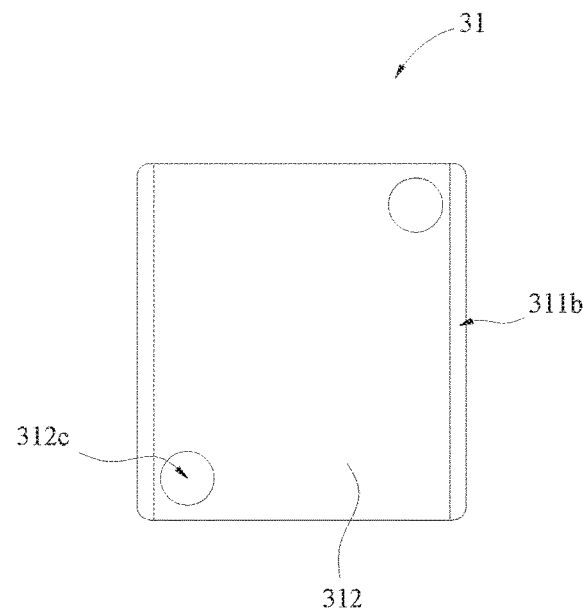
FIG. 8 is a schematic bottom view of the structure of the first electrode terminal in FIG. 4.
Figure 9:
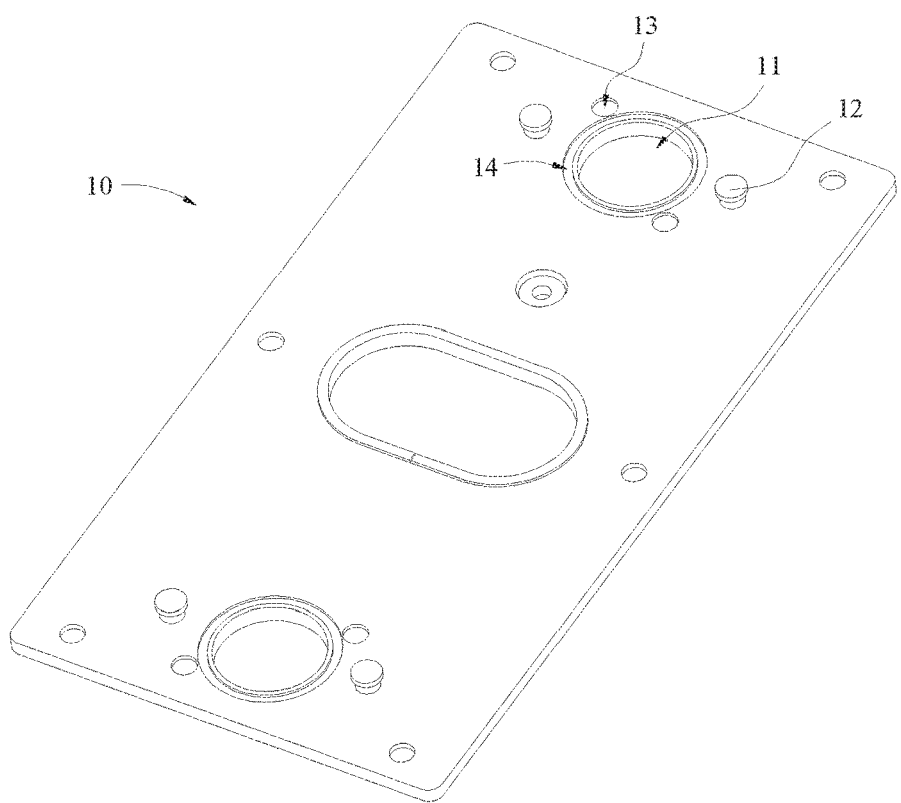
FIG. 9 is a three-dimensional structural schematic diagram of the cap plate in the cap assembly of FIGS. 1 to 3.
Figure 10:
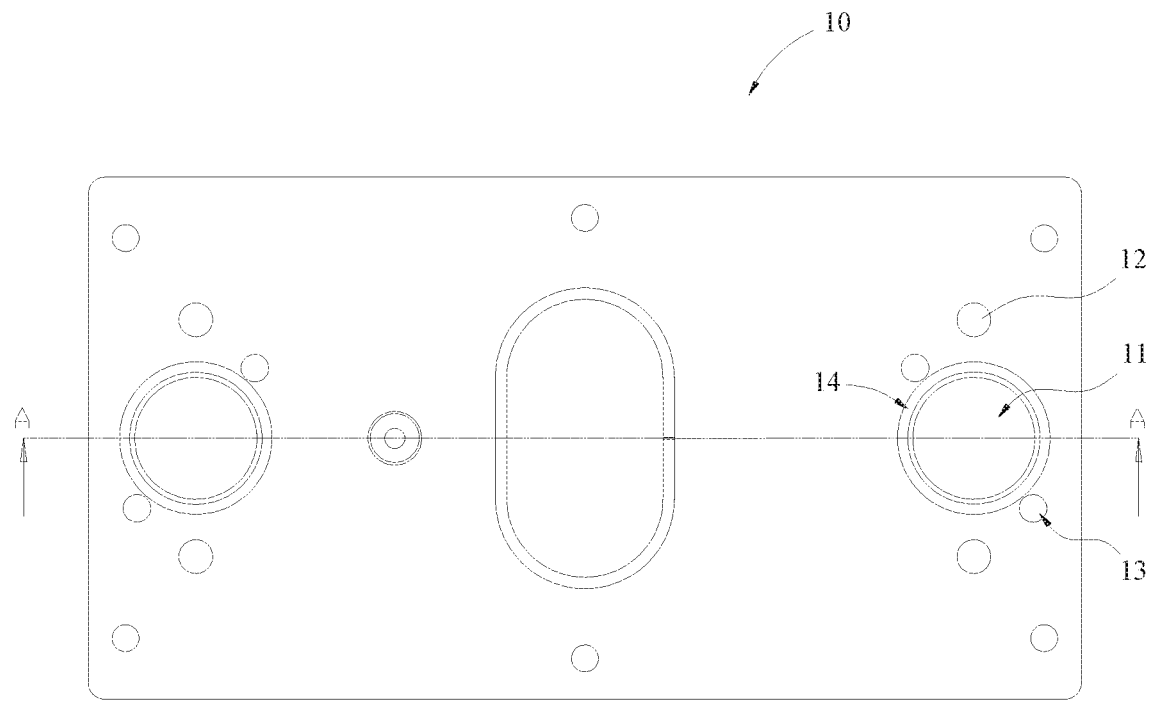
FIG. 10 is a schematic top view of the structure of the cap plate in the cap assembly of FIGS. 1 to 3.
Figure 11:
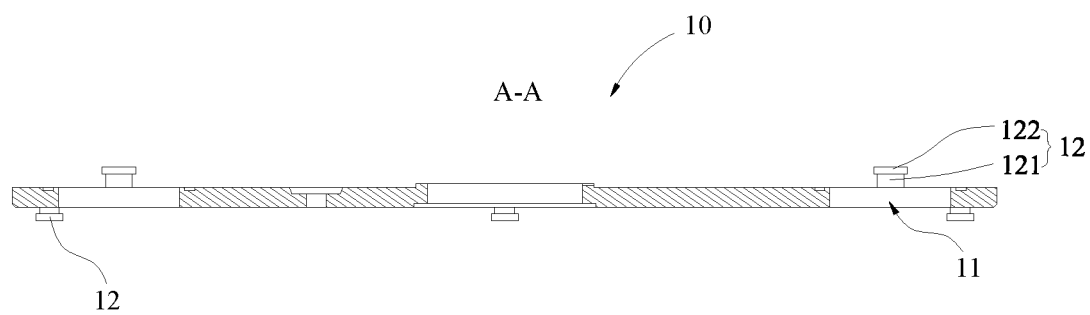
FIG. 11 is a schematic cross-sectional structural diagram of the cap plate in FIG. 10 taken along a section line A-A.

FIG. 8 is a schematic bottom view of the structure of the first electrode terminal 31 of FIG. 4; FIG. 9 is a three-dimensional structural schematic diagram of the cap plate 10 of the cap assembly 100 of FIGS. 1 to 3; FIG. 10 is a schematic top view of the structure of the cap plate 10 in the cap assembly 100 of FIGS. 1 to 3; FIG. 11 is a schematic cross-sectional structural diagram of the cap plate 10 in FIG. 10 taken along a section line A-A.

With reference to FIGS. 9 to 11, according to an embodiment of the present disclosure, the connecting member for the fixing member 32 includes a riveting member 12, and the riveting member 12 includes a nail body 121 and a limiting portion 122. One end of the nail body 121 is connected to an upper surface of the cap plate 10 (i.e., a surface at a side of the cap plate 10 away from the inside of the shell), and the other end of the nail body 121 is connected to the limiting portion 122. An outer peripheral surface of the limiting portion 122 protrudes from an outer peripheral surface of the nail body 121 (i.e., the area of the cross section of the limiting portion 122 is greater than the area of the cross section of the nail body 121). Two opposite sides of the fixing member 32 respectively extend outwardly to form extended edges, and at least one connecting hole 323 is provided at each extending edge. The aperture of the connecting hole 323 is adapted to the size of the nail body 121 of the riveting member 12 (as shown in FIG. 1).

In a specific implementation, the riveting member 12 can fix the fixing member 32 onto the cap plate 10 in the following ways. In a specific example, the nail body 121 may be integrally provided on the cap plate 10. After the nail body 121 passes through the connecting hole 323 provided on the fixing member 32, a force is applied at an end of the nail body 121 away from the cap plate 10, until the limiting portion 122 is formed and the limiting portion 122 and the surface of the fixing member 32 away from the cap plate 10 are engaged against each other to fix the fixing member 32 onto the cap plate 10.

In another specific example, the nail body 121 and the limiting portion 122 may be formed as an integral structure, and the nail body 121 is provided with a screw thread structure, and correspondingly, the cap plate 10 is provided with a screw thread hole adapted to the screw thread structure of the nail body 121. As such, after the nail body 121 passes through the connecting hole 323 provided on the fixing member 32, the limiting portion 122 and the surface of the fixing member 32 away from the cap plate 10 may be engaged against each other, and the fixing member 32 may be fixed onto the cap plate 10 through the fastening of the screw thread structure of the nail body 121 into the corresponding screw thread hole provided on the cap plate 10.

In addition, in yet another specific example, the fixing member 32 can also be directly formed on the cap plate 10 having the riveting member 12 by an integral injection molding process, so that the riveting member 12 can be directly wrapped inside the fixing member 32 and engaged to the fixing member 32 so as to fix the member 32 onto the cap plate 10. In addition, the integral injection molding process may not cause any damage to the structure of the fixing member 32.

Figure 12:
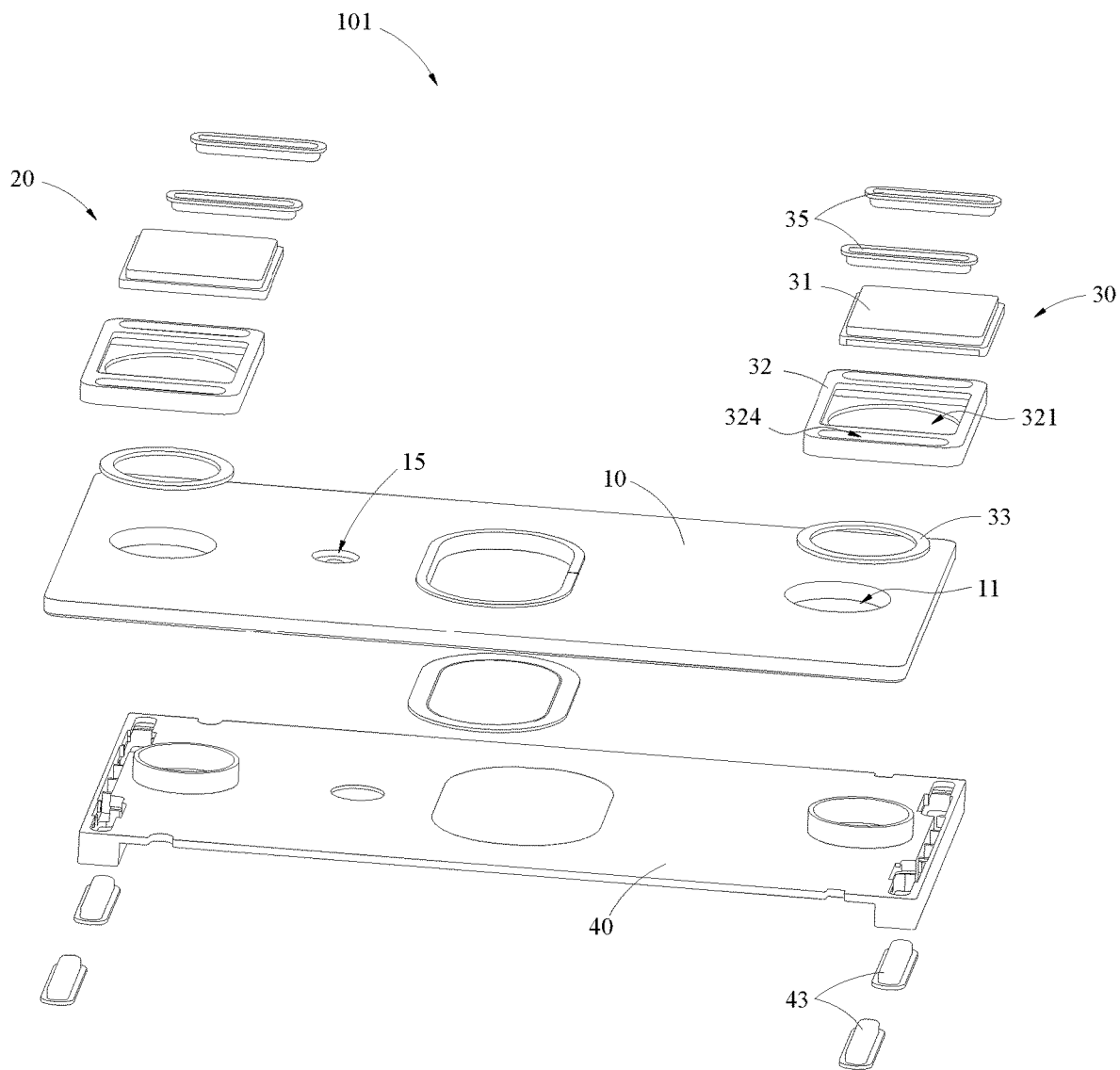
FIG. 12 is a schematic diagram of an exploded structure of a cap assembly for a secondary battery according to another embodiment of the present disclosure.
Figure 13:
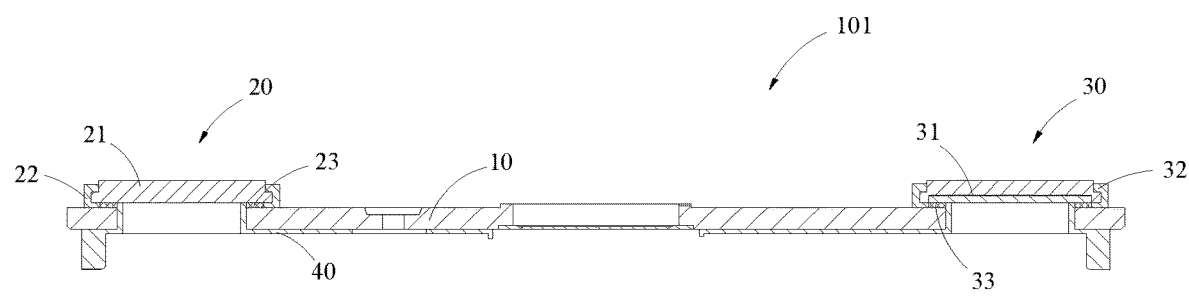
FIG. 13 is a schematic cross-sectional structural diagram of the cap assembly of FIG. 12 taken along a longitudinal direction.

FIG. 12 is a schematic diagram of an exploded structure of a cap assembly 101 of a secondary battery according to another embodiment of the present disclosure; FIG. 13 is a schematic cross-sectional structural diagram of the cap assembly 101 of FIG. 12 taken along a longitudinal direction. As shown in FIG. 12 and FIG. 13, the structure of the cap assembly 101 in this embodiment is similar to the structure of the cap assembly 100 in the above embodiments. Therefore, in this embodiment, same reference numbers are used for the same components as those in the cap assembly 100. Further, the structures and connections that have been described in the above embodiments will not be described again.

In an alternative embodiment, the connecting member for fixing the fixing member 32 may further include a first connecting plate 35. Specifically, the first connection plate 35 is made of a metal material, and includes an engagement portion (not shown in the figures) and a contact portion (not shown in the figures) connected with the engagement portion, wherein the contact portion has a prismatic structure and has a recessed portion formed on a side of the contact portion, and the engagement portion is a flange connected at an edge of an opening of the recessed portion.

Each of the two opposite extending edges of the fixing member 32 is provided with a notch 324. The notch 324 is provided with a groove on two opposite sidewalls thereof along the longitudinal direction for accommodating the engagement portion of the first connecting plate 35, so that the engagement portion of the first connecting plate 35 can be inserted into the groove of the notch 324 and the contact portion of the first connection plate 35 can be exposed out of the notch 324 and contact with the cap plate 10. The contact portion of the first connecting plate 35 may be welded to the cap plate 10, and then the fixing member 32 can be fixed to the cap plate 10 through the first connecting plate 35. By providing the recessed portion on the contact portion of the first connecting plate 35, the laminated thickness of the contact portion and the cap plate 10 can be reduced so as to facilitate the welding connection between the first connecting plate 35 and the cap plate 10. Preferably, the upper surface of the contact portion and the upper surface of the cap plate are substantially in a same level. In this case, a butt-seam welding may be adopted.

In addition, in this embodiment, for example, the lower insulator 40 may also be welded to a side of the cap plate 10 facing the inside of the shell by using a second connecting plate 43. The specific manner of connecting the lower insulator 40 to the cap plate 10 through the second connecting plate 43 is the same as that of connecting via welding the fixing member 32 to the cap plate 10 through the first connecting plate 35 as above mentioned, which will not be described again. In addition, in this embodiment, the sealing member 33 only has an annular and plate-shaped body.

Of course, the specific structure of the fixing member 32 will not be limited in the embodiments of the present disclosure. In other embodiments, in case that the first electrode terminal 31 is circular or in other shapes, the fixing member 32 is only required to be provided with an accommodation space adapted to the shape of the first electrode terminal 31. In addition, the riveting member 12 may be disposed at a side of the cap plate 10 away from the fixing member 32, so that the cap plate 10 can be connected to the lower insulator 40 through the riveting member 12 in a manner of connection with the fixing member 32 through the riveting member 12.

In an alternative embodiment, the terminal assembly 30 may further include an anti-rotation component. As shown in FIG. 1 and FIG. 2, in this embodiment, the anti-rotation component of the terminal assembly 30 is a stopper 34, and the anti-rotation component of the terminal assembly 20 is a stopper 24. Specifically, the terminal assembly 30 may include two stoppers 34, and the two stoppers 34 are cylindrical. Two first grooves 312c are provided on a surface of the first electrode terminal 31 facing the cap plate 10, and two via holes 322 adapted to the first grooves are provided on the fixing member 32. Two second grooves 13 opposite to the via holes 322 are provided on a surface of the cap plate 10 facing the first electrode terminal 31. The two stoppers 34 pass through the two via holes 322 of the fixing member 32 respectively, and engage into two first grooves 312c and two second grooves 13 respectively.

In this way, the first electrode terminal 31 and the fixing member 32 may be positioned on the cap plate 10 by two fixing points formed by the two stoppers 34, so as to prevent the first electrode terminal 31 and the fixing member 32 from rotating along the surface of the cap plate 10 relative to the cap plate 10. Furthermore, it is also possible to prevent the first electrode terminal 31 and the fixing member 32 from moving relative to each other. Thus, the anti-rotation component may also ensure stability of the engagement between the first electrode terminal 31 and the fixing member 32 and prevent stability of the structure of the terminal assembly 30 from being affected due to the first electrode terminal 31 and the fixing member 32 being separated from each other. Of course, the number of the stoppers 34 is not limited to the embodiments of the present disclosure. In other embodiments, the terminal assembly 20 may also include more stoppers 34. Of course, in some embodiments, the stopper 34 and the cap plate 10 may be formed as an integral structure, or the stopper 34 and the first electrode terminal 31 may be formed as an integral structure.

In addition, the specific structure of the anti-rotation component and the engagement manner between the anti-rotation component and the first electrode terminal 31 and between the anti-rotation component and the cap plate 10 are not limited in the embodiments of the present disclosure. For example, in other embodiments, the anti-rotation component may further include other protrusion structures and groove structures fitted with each other that are disposed between the first electrode terminal 31 and the fixing member 32 and between the fixing member 32 and the cap plate 10. In addition, since both the first electrode terminal 31 and the fixing member 32 are square, it is also possible to provide the anti-rotation component correspondingly only between the fixing member 32 and the cap plate 10 so as to limit the rotation of the fixing member 32 relative to the cap plate 10.

Figure 14:
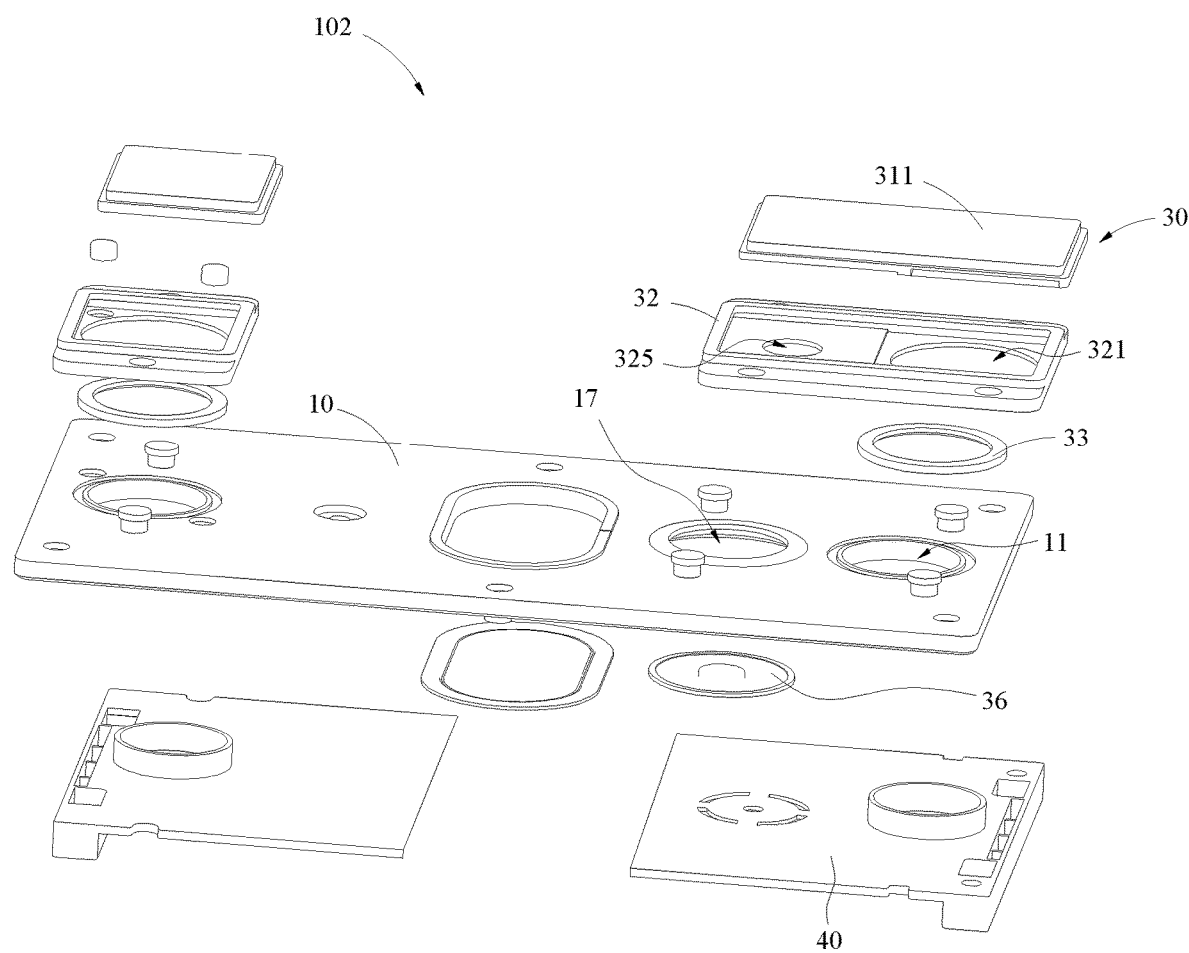
FIG. 14 is a schematic diagram of an exploded structure of cap assembly according to a further embodiment of the present disclosure.
Figure 15:
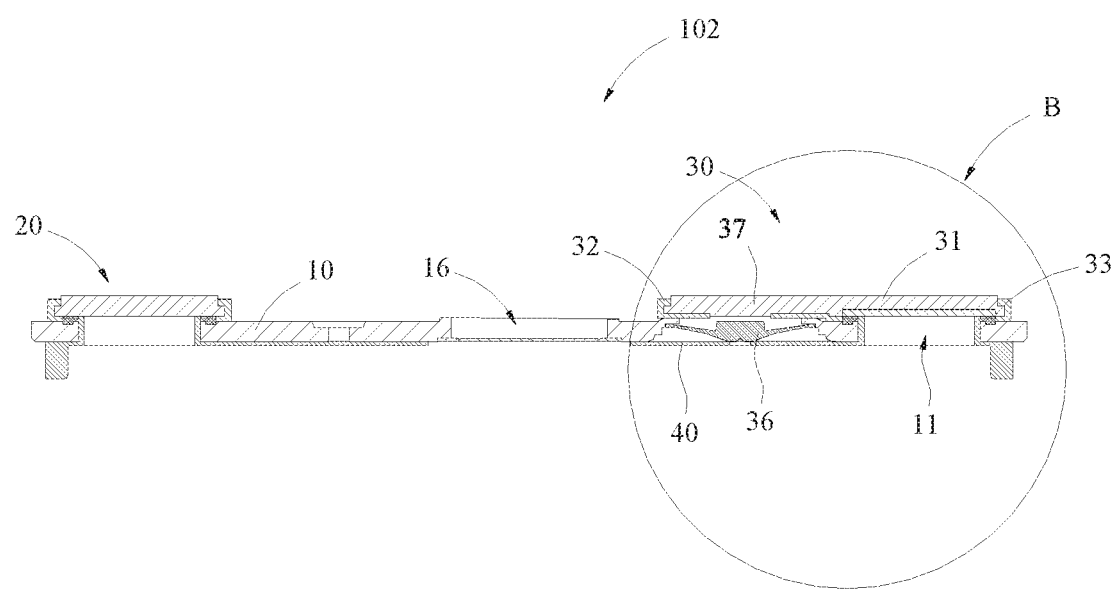
FIG. 15 is a schematic cross-sectional structural diagram of the cap assembly of FIG. 14 taken along a longitudinal direction.
Figure 16:
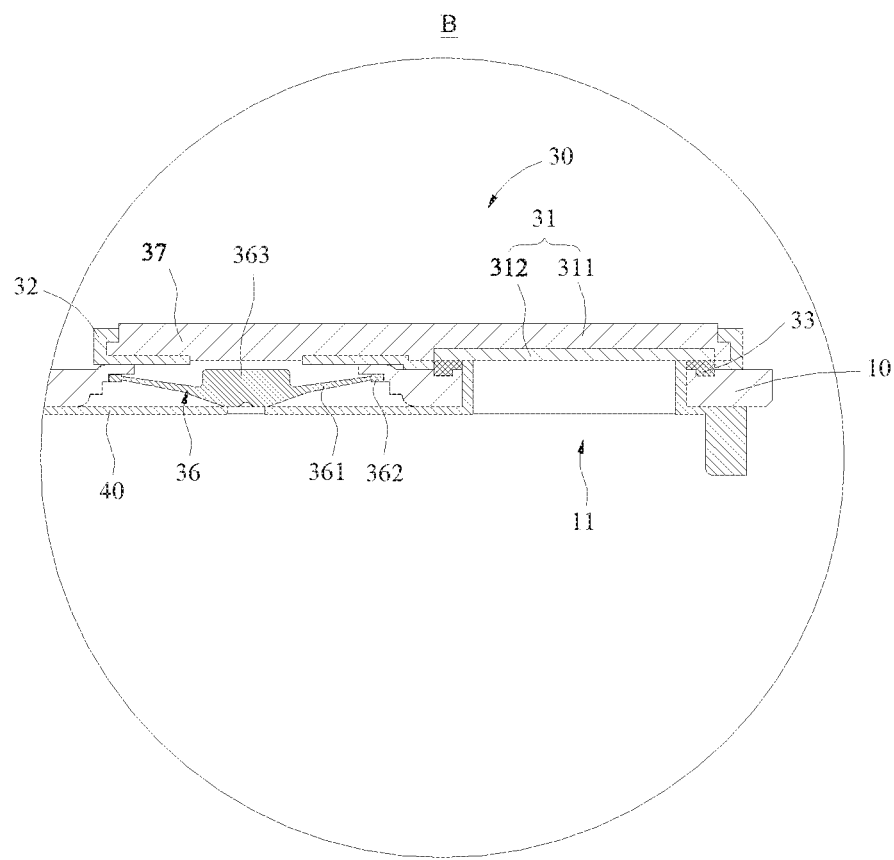
FIG. 16 is an enlarged partial view of a portion B of the cap assembly in FIG. 15.

FIG. 14 is a schematic diagram of an exploded structure of a cap assembly 102 according to a further embodiment of the present disclosure; FIG. 15 is a schematic cross-sectional structural diagram of the cap assembly 102 of FIG. 14; FIG. 16 is an enlarged partial view of a portion B of the cap assembly in FIG. 15. As shown in FIGS. 14 to 16, in the cap assembly 102 in this embodiment, same reference numbers are used for the same components as those in the cap assembly 100 in the above embodiments. Further, the structures that have already been described will not be described again. In the present embodiment, the difference from the above embodiments is that the cap assembly 102 has a conductive sheet 37 and a deformable sheet 36 on the cap plate 10 between the second electrode terminal 21 and the first electrode terminal 31, for short-circuiting the positive electrode plate and the negative electrode plate of the electrode assembly when the pressure inside the secondary battery is increased. For convenience, the exemplary embodiment will mainly describe the cap assembly 101 in the present embodiment with reference to the configuration in which the deformable sheet 36 and the conductive sheet 37 are disposed on the first electrode terminal 31 side. However, the embodiments of the present disclosure are not limited in this respect.

The terminal assembly 20 is the same as the terminal assembly 20 of the cap assembly 100 in the above embodiments, while the terminal assembly 30 is different from the terminal assembly 30 of the cap assembly 100 in the above embodiments. Also, the first electrode terminal 31 is electrically insulated from the cap plate 10, while the terminal assembly 20 is electrically connected to the cap plate 10. For example, in this embodiment, the terminal assembly 30 may include a first electrode terminal 31, a fixing member 32, a sealing member 33, a deformable sheet 36 and a conductive sheet 37. The deformable sheet 36 is disposed in a mounting hole 17 provided in an area of the cap plate 10 adjacent to the electrode lead-out hole 11.

Specifically, the mounting hole 17 is provided in the area of the cap plate 10 adjacent to the electrode lead-out hole 11, and a hole wall of the mounting hole 17 is formed with a stepped sink. The deformable sheet 36 has a film-shaped bent portion 361, a circumferential edge portion 362, and a protruding portion 363, wherein the bent portion 361 is configured as a circular arc that protrudes toward the inner space of the shell, a circumferential edge portion 362 is formed on the outer side of the bent portion 361 so as to be hermetically connected to the sink of the mounting hole 17 by the circumferential edge portion 362 and thus to electrically connect the deformable sheet 36 to the cap plate 10; and the protruding portion 363 protrudes from the substantially center position of the bent portion 361 to the outside of the shell. The deformable sheet 36 is configured such that the bent portion 361 of the deformable sheet 36 can flip over and deform to be bent toward the outside of the shell when the pressure inside the shell is increased.

In an alternative embodiment, the deformable sheet 36 is mounted in the mounting hole 17 without its top and bottom surfaces exceeding the top and bottom surfaces of the cap plate 10 (of course, relative to the interior of the shell of the secondary battery). As a result, the installation of the deformable sheet 36 does not occupy a space inside the shell of the secondary battery, so as to increase the energy density of the secondary battery, and at the same time, the mounting of the deformable sheet 36 is simplified.

The conductive sheet 37 is electrically connected to the first electrode terminal 31. In this embodiment, the first electrode terminal 31 includes a first terminal board 311 and a second terminal board 312, wherein the second terminal board 312 is also snapped into the groove provided on a side surface of the first terminal board 311 facing the cap plate 10 to form a composite board strip with a first terminal board 311, and the second terminal board 312 covers the electrode lead-out hole 11. However, in this embodiment, the first terminal board 311 has a longer longitudinal length than the second terminal board 312. The material of the conductive sheet 37 and the material of the first terminal board 311 have a same base metal. Preferably, the conductive sheet 37 and the first terminal board 311 are integrally formed as one body. Therefore, at this time, the entire configuration of the conductive sheet 37 and the first terminal board 311 is referred to as a first terminal board 311.

The fixing member 32 has an accommodation space adapted to the shape of the first electrode terminal 31, and simultaneously covers the electrode lead-out hole 11 and the mounting hole 17. A first through hole 321 corresponding to the electrode lead-out hole 11 and a second through hole 325 corresponding to the mounting hole 17 are provided on the fixing member 32 respectively (as shown in FIG. 14). An outer peripheral surface of the first electrode terminal 31 is at least partially surrounded by the fixing member 32 to be fixed to the cap plate 10 by the fixing member 32. Also, a part of the fixing member 32 is located between the first terminal board 311 and the cap plate 10 to insulate the cap plate 10 and the first electrode terminal 31 from each other. Meanwhile, the second terminal board 312 is exposed inside the shell via the first through hole 321, and the first terminal board 311 (that is, the portion of the conductive sheet 37 integrally formed on the first terminal board 311) and the deformable sheet 36 provided in the mounting hole 17 are opposite to each other and are maintained in a separated state via the second through hole 325. A sealing member 33 is provided around the electrode lead-out hole 11 between the second terminal board 312 and the cap plate 10 to seal the electrode lead-out hole 11.

Thereby, when the pressure inside the shell of the secondary battery increases (for example, exceeds a predetermined pressure threshold), the deformable sheet 36 can deform such that the bent portion 361 of the deformable sheet 36 is turned in a direction away from the interior space of the shell, so that the protruding portion 363 thereon is in contact with and electrically connected to the first terminal board 311, and thus the first electrode terminal 31 and the second electrode terminal 21 electrically connected to the cap plate 10 are maintained in a short-circuited state. Therefore, the deformable sheet 36 is electrically connected to the conductive sheet 37 (that is, the first terminal board 311 in this embodiment) by deforming in response to the increased pressure inside the shell, the positive electrode plate and the negative electrode plate in the electrode assembly can be short-circuited to each other. However, since a large current occurs instantaneously (or substantially instantaneously) between the positive electrode plate and the negative electrode plate in the event of a short circuit, the electrode assembly is discharged.

Of course, the deformable sheet 36 can also be attached to the cap plate 10 by other means, as long as the deformable sheet 36 can contact and be electrically connected with the conducting sheet 37 through deformation when the pressure in the secondary battery increases.

In addition, in the cap assembly 102 in this embodiment, the lower insulator 40 is different from the lower insulator 40 in the cap assembly 100 in the above embodiment in that the lower insulator 40 in this embodiment is a split structure so that the anti-explosion valve assembly 16 is exposed toward the inside of the shell from the space portion between the two portions of the lower insulator 40. As such, an insulating state between the cap plate 10 and the electrode assembly and the wiring board inside the shell can be maintained by the lower insulator 40 having the split structure, and thus the material can be saved.

Figure 17:
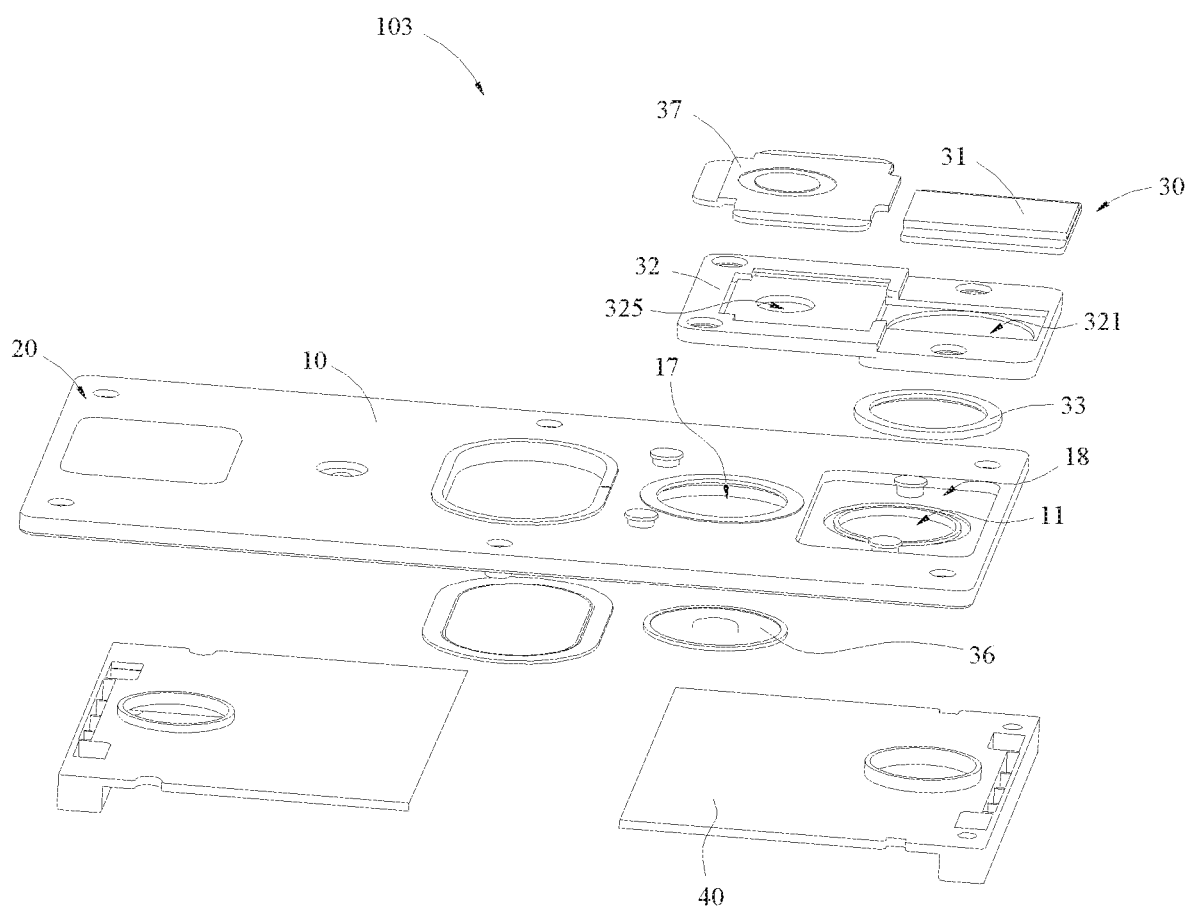
FIG. 17 is a schematic diagram of an exploded structure of a cap assembly according to yet another embodiment of the present disclosure.
Figure 18:
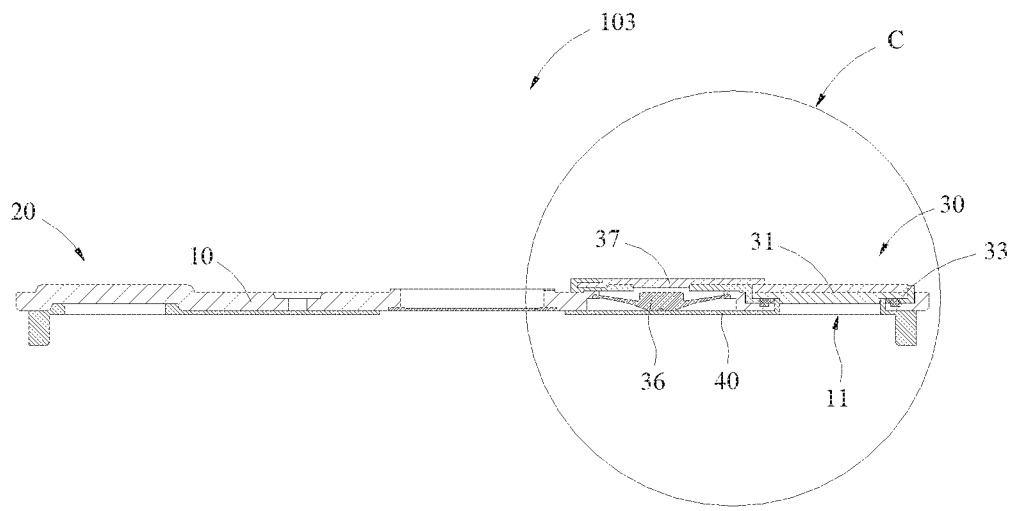
FIG. 18 is a schematic cross-sectional structural diagram of the cap assembly of FIG. 17 taken along a longitudinal direction.
Figure 19:
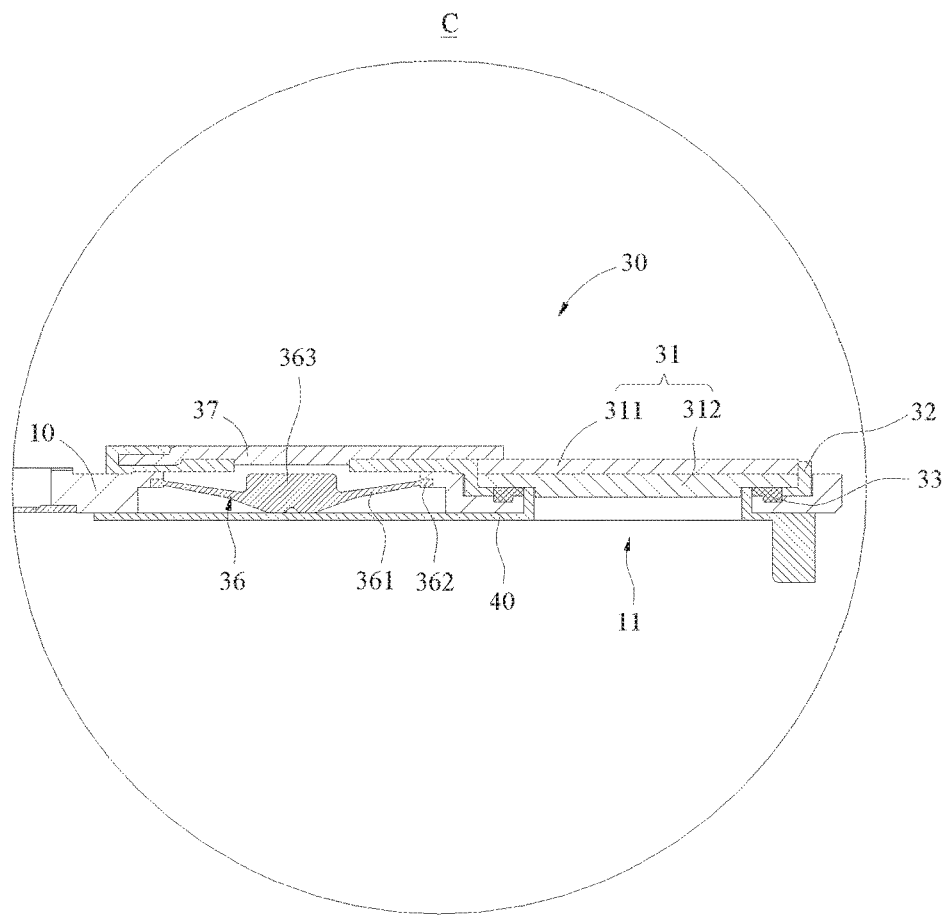
FIG. 19 is an enlarged partial view of a portion C of the cap assembly of FIG. 18.

FIG. 17 is a schematic exploded view of the three-dimensional structure of the cap assembly 103 according to yet another embodiment of the present disclosure; FIG. 18 is a schematic cross-sectional structural diagram of the cap assembly 103 of FIG. 17 taken along a longitudinal direction; FIG. 19 is an enlarged partial view of a portion C of the cap assembly 103 of FIG. 18. As shown in FIGS. 17 to 19, same reference numbers are used for the same components in the cap assembly 103 in this embodiment as those in the cap assembly 102 in the above embodiments, and the structures that have already been described will not be described again. In this embodiment, the difference from the above embodiments is that the conductive sheet 37 and the first terminal board 311 in the first electrode terminal 31 form a split structure. For convenience, this exemplary embodiment will mainly describe the cap assembly 102 in this embodiment with reference to the configuration in which the deformable sheet 36 and the conductive sheet 37 are disposed on the first electrode terminal 31 side. However, the embodiments of the present disclosure are not limited in this respect. In this embodiment, the terminal assembly 30 also includes a first electrode terminal 31, a fixing member 32, a sealing member 33, a deformable sheet 36 and a conductive sheet 37. The manner in which the deformable sheet 36 is mounted in the mounting hole 17 is the same as the manner of mounting the deformable sheet 36 in the cap assembly 102 in the above embodiments, and meanwhile, the manner of disposing the sealing members 33 is the same as the manner of disposing the sealing member 33 in the cap assembly 101 in the above embodiments, and thus will not be further described.

Specifically, the conductive sheet 37 is electrically connected to the first electrode terminal 31. In this embodiment, the first electrode terminal 31 may also include a first terminal board 311 and a second terminal board 312, wherein the first terminal board 311 and the second terminal board 312 are respectively board-like bodies, and the first terminal board 311 and the second terminal board 312 are connected to each other by only one side surface. The conductive sheet 37 is electrically connected to the first electrode terminal 31.

The fixing member 32 has accommodation spaces respectively corresponding to the first electrode terminal 31 and the conductive sheet 37, and simultaneously covers the electrode lead-out hole 11 and the mounting hole 17. A first through hole 321 corresponding to the electrode lead-out hole 11 and a second through hole 325 corresponding to the mounting hole 17 are provided on the fixing member 32 respectively (as shown in FIG. 17). The fixing member 32 is formed in a stepped shape in which a portion of the fixing member 32 for fixing the first electrode terminal 31 is closer to the cap plate 10 than a portion for fixing the conductive sheet 37. The first electrode terminal 31 and the conductive sheet 37 are respectively clamped in corresponding accommodation spaces, so that the outer peripheral surfaces of the first electrode terminal 31 and the conductive sheet 37 are respectively at least partially surrounded by the fixing member 32 and are simultaneously fixed on a same side of the cap plate 10 by the fixing member 32. At the same time, the second terminal board 312 is exposed inside the shell via the first through hole 321, and the conductive sheet 37 and the deformable sheet 36 provided in the mounting hole 17 are opposite to each other and are maintained in a separated state via the second through hole 325. The conductive sheet 37 is lapped to the first electrode terminal 31 by a protruding edge provided by extending along an edge to achieve an electrical connection with the first electrode terminal 31. Since the deformable sheet 36 is disposed in the mounting hole 17, and the first electrode terminal 31 and the conductive sheet 37 are simultaneously located on a side of the cap plate 10 away from the interior of the shell, therefore the structure provided on the cap assembly 103 does not occupy the internal space of the shell, so that it is possible to increase the energy density of the secondary battery.

Thereby, when the pressure inside the shell of the secondary battery increases (for example, exceeds a predetermined pressure threshold), the deformable sheet 36 can deform such that the bent portion 361 of the deformable sheet 36 is bent in a direction away from the interior space of the shell, so that the protruding portion 363 thereon is in contact with and electrically connected to the first terminal board 311, and thus the first electrode terminal 31 and the second electrode terminal 21 electrically connected to the cap plate 10 are maintained in a short-circuited state.

In an alternative embodiment, as shown in FIGS. 17 to 19, the cap plate 10 is provided with a sunken portion 18 around the electrode lead-out hole 11, so that the fixing member 32 for fixing the portion of the first electrode terminal 31 and the first electrode terminals 31 can be placed together in the sunken portion 18. As a result, the surface of the conductive sheet 37 away from the cap plate 10 protrudes beyond the surface of the first electrode terminal 31 away from the cap plate 10. Also, parts of the fixing member 32 are located between the first electrode terminal 31 and the cap plate 10 and between the conductive sheet 37 and the cap plate 10 to insulate the first electrode terminal 31 and the conductive sheet 37 from the cap plate 10 respectively. Therefore, by providing the sunken portion 18 on the cap plate 10, after the first electrode terminal 31 is electrically connected to the busbar (not shown), at a side away from the cap plate 10, the busbar and the surface of the conductive sheet 37 are substantially in a same level. Therefore, the space occupied by the module composed of secondary batteries in the battery pack can be reduced, so that more installation space can be reserved for the height of the secondary battery. Therefore, the energy density of the secondary battery can be increased, and meanwhile, it is possible to facilitate a reasonable layout for the cables in the battery pack.

Of course, the deformable sheet 36 can also be attached to the cap plate 10 by other means, as long as the deformable sheet 36 can contact and be electrically connected with the conducting sheet 37 through deformation when the pressure in the secondary battery increases.

In addition, in this embodiment, the second electrode terminal 21 in the terminal assembly 20 and the cap plate 10 are of an integral structure, that is, the positive electrode plate of the electrode assembly inside the shell is directly electrically connected to the cap plate 10, thereby the cap plate 10 serves as the second electrode terminal 21 in the terminal assembly 20 to connect to the busbar.

Figure 20:
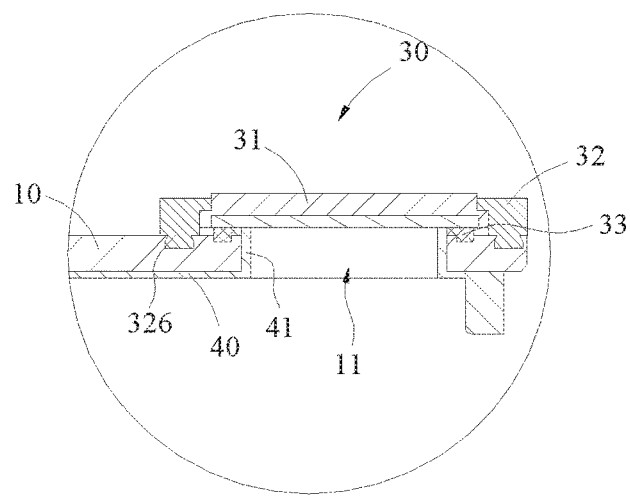
FIG. 20 is a schematic cross-sectional view of a partial structure of a terminal assembly according to a specific example of the present disclosure.

FIG. 20 is a schematic cross-sectional view of a partial structure of a terminal assembly 30 according to a specific example of the present disclosure. Since the overall structure of the cap assembly in this embodiment is similar to that of the cap assembly 100 in the above embodiments, FIG. 20 only shows the partial structure of the terminal assembly 30. Therefore, in this embodiment, same reference numbers are used for the same components as those in the cap assembly 100 described above, and the structures and connection relationships that have been described in the above embodiments will not be described again in this embodiment.

In this embodiment, the connecting member is an undercut 326 integrally formed on the fixing member 32. Correspondingly, an undercut hole (not shown in the figures) corresponding to the undercut 326 is provided on the cap plate 10. Specifically, a plurality of undercut holes may be provided around the electrode lead-out holes 11, and a diameter of each undercut hole increases along the direction from the fixing members 32 to the cap plate 10 (the increment mentioned here does not mean that a hole diameter of a undercut hole is sequentially increased along the direction from the fixing member 32 to the cap plate 10, but means that a hole diameter of one end of the undercut hole away from the fixing member 32 is larger than a hole diameter of one end of the undercut hole close to the fixing member 32, that is, the lower hole diameter is larger than the upper hole diameter of the undercut hole, so as to realize the snap fit action of the undercut and the undercut hole. Correspondingly, the surface of the fixing member 22 facing the cap plate 10 is provided with an undercut 326 capable of adapting to the shape of the undercut hole. Thus, the undercut 326 provided on the fixing member 32 and the undercut hole provided on the cap plate 10 snap fit with each other, so that the fixing member 32 can be fixed to the cap plate 10.

In addition, according to one embodiment of the present disclosure, there is also provided a secondary battery (not shown in the figures) including: a shell, a cap assembly according to any one of the above embodiments and an electrode assembly, wherein the shell has an opening; the electrode assembly is accommodated in the shell; the cap assembly covers the opening of the shell to enclose the electrode assembly in the shell.

In addition, according to another embodiment of the present disclosure, there is also provided a battery module (not shown in the figures) including a busbar and the secondary battery described above, and the busbar is welded to the first terminal board 311 of the cap assembly of the secondary battery. Since the secondary battery and the battery module include the cap assembly in any one of the above embodiments, the same advantages as those of the cap assembly will not be described again.

In an optional embodiment, in order to facilitate connection of a plurality of secondary batteries in series or in parallel, the material of the busbar and the material of the first terminal board 311 have a same base metal.

The invention may be embodied in other specific forms without departing from the spirit and essential characteristics thereof. The embodiments discussed therefore should be considered in all aspects as illustrative and not restrictive. The scope of the invention is defined by the appended claims rather than by the foregoing description, and those modifications falling within the meaning and equivalents of the claims are thus intended to be embraced by the scope of the invention. Different technical features in different embodiments may be combined to obtain beneficial effects. Other variations of the described embodiments can be understood and practiced by those skilled in the art upon studying the drawings, the specification and the claims herein.

What is claimed is:

1. A cap assembly for a secondary battery, comprising a cap plate, a first electrode terminal, a sealing member, a fixing member and a connecting member, wherein:
    the cap plate has an electrode lead-out hole;
    the first electrode terminal comprises a first terminal board and a second terminal board connected with the first terminal board, wherein the first terminal board is located at a side of the second terminal board away from the cap plate, the second terminal board completely covers the electrode lead-out hole, and the material of the first terminal board and the material of the second terminal board have different base metals;

the sealing member surrounds the electrode lead-out hole and is disposed between the cap plate and the first electrode terminal to seal the electrode lead-out hole;

wherein the cap plate is made of a metal material, the connecting member is made of a metal material, the fixing member is a hard plastic member, the fixing member is directly fixed to the connecting member, the connecting member is in direct contact with the cap plate so that the connecting member is fixed to the cap plate, the fixing member is directly fixed to the cap plate by the connecting member, and an outer peripheral surface of the first electrode terminal is at least partially surrounded by the fixing member to fix the first electrode terminal to the fixing member, and wherein the first electrode terminal is completely located outside a shell of the secondary battery.

2. The cap assembly of claim 1, wherein the sealing member is in close contact with the cap plate and the second terminal board.

3. The cap assembly of claim 1, wherein the first terminal board and the second terminal board form a composite board strip.

4. The cap assembly of claim 1, wherein the second terminal board further comprises an extension portion extending into the electrode lead-out hole.

5. The cap assembly of claim 1, wherein the first terminal board and the second terminal board are joined together by a cold rolling method, a hot rolling method, an explosion compound method, or an explosion rolling method.

6. The cap assembly of claim 1, wherein one of the first electrode terminal and the fixing member has a convex portion, and the other has a concave portion that accommodates the convex portion, and the convex portion is fitted with the concave portion.

7. The cap assembly of claim 6, wherein the convex portion is provided on the outer peripheral surface of the first electrode terminal, the concave portion is provided on an inner wall surface of the fixing member corresponding to the convex portion, and a surface of the first electrode terminal away from the cap plate protrudes from a surface of the fixing member away from the cap plate.

8. The cap assembly of claim 7, wherein the convex portion is provided on an outer peripheral surface of the first terminal board.

9. The cap assembly of claim 1, wherein a portion of the fixing member is located between the cap plate and the first electrode terminal.

10. The cap assembly of claim 1, wherein the connecting member comprises a nail body and a limiting portion which are connected with each other, and wherein an outer peripheral surface of the limiting portion protrudes from an outer peripheral surface of the nail body, an end of the nail body away from the limiting portion is fixed on the cap plate, and the limiting portion is engaged with the fixing member.

11. The cap assembly of claim 1, wherein the connecting member comprises a first connecting plate, and wherein a portion of the first connecting plate is embedded into the fixing member and engaged with the fixing member, and another portion of the first connecting plate is welded with the cap plate.

12. The cap assembly of claim 1, wherein the connecting member comprises an undercut and an undercut hole, wherein the undercut hole is provided on a surface of the cap plate facing the fixing member, and an aperture of the undercut hole is increased along a direction from the first terminal board to the cap plate, the undercut is connected with the fixing member and is adapted with the undercut hole in form, and the undercut is fitted with the undercut hole.

13. The cap assembly of claim 1, further comprising a second electrode terminal, a deformable sheet and a conductive sheet, wherein the second electrode terminal is electrically connected with the cap plate, the first electrode terminal is insulated from the cap plate, the deformable sheet is attached to the cap plate, the conductive sheet is electrically connected with the first electrode terminal, wherein when a pressure within the secondary battery exceeds a predetermined pressure value, the deformable sheet deforms and is electrically connected with the conductive sheet.

14. The cap assembly of claim 13, wherein the conductive sheet and the first electrode terminal are located on a same side of the cap plate, a surface of the conductive sheet away from the cap plate protrudes from a surface of the first electrode terminal away from the cap plate.

15. The cap assembly of claim 13, wherein the material of the first terminal board and the material of the conductive sheet have a same base metal.

16. A secondary battery, comprising:
a shell having an opening;
an electrode assembly accommodated in the shell; and
the cap assembly of claim 1, wherein the cap assembly covers the opening of the shell to enclose the electrode assembly in the shell.

17. A battery module, comprising:
a busbar; and
the secondary battery of claim 16, wherein the busbar is welded to the first terminal board.

18. The battery module of claim 17, wherein the material of the busbar and the material of the first terminal board have a same base metal.

* * * * *